United States Patent [19]
Kratel et al.

[11] 3,929,718
[45] Dec. 30, 1975

[54] ORGANOPOLYSILOXANE ELASTOMERS ADMIXED WITH FILLERS SUBJECTED TO MECHANICAL STRESS

[75] Inventors: Gunter Kratel; Jorg Patzke; Karl-Heinrich Wegehaupt, all of Burghausen, Germany

[73] Assignee: Wacker-Chemie GmbH, Munich, Germany

[22] Filed: Aug. 16, 1974

[21] Appl. No.: 497,973

[30] Foreign Application Priority Data
Aug. 30, 1973 Germany.............................. 2343846

[52] U.S. Cl............................ 260/37 SB; 106/308 Q
[51] Int. Cl.².......................................... C08L 83/04
[58] Field of Search............... 260/37 SB; 106/308 Q

[56] References Cited
UNITED STATES PATENTS

| | | | |
|---|---|---|---|
| 3,004,859 | 10/1961 | Lichtenwalner............ | 260/37 SB X |
| 3,128,196 | 4/1964 | Pierpoint..................... | 260/37 SB X |
| 3,464,951 | 9/1969 | Hittmair et al................. | 260/37 SB |

*Primary Examiner*—Lewis T. Jacobs

[57] ABSTRACT

Organopolysiloxane elastomers having improved properties comprising a vulcanizable organopolysiloxane composition containing finely divided silicon dioxide fillers which have been subjected to mechanical stress during and/or prior to treatment with organosilicon compounds.

7 Claims, No Drawings

ORGANOPOLYSILOXANE ELASTOMERS ADMIXED WITH FILLERS SUBJECTED TO MECHANICAL STRESS

The present invention relates to organopolysiloxane elastomers and particularly to a method for preparing organopolysiloxane elastomers having improved properties. More particularly, this invention relates to a method for treating fillers to impart improved properties to organopolysiloxane elastomers containing the same.

Organopolysiloxane elastomers have been prepared heretofore by cross-linking or vulcanizing compositions containing diorganopolysiloxanes and finely divided silicon dioxide fillers which have been treated with organosilicon compounds. (German Pat. No. DT-AS 1,951,620.)

The treatment of fillers, particularly silicon dioxide and their incorporation in compositions containing organopolysiloxanes provides many advantages over those disclosed heretofore in the art. For example, finely divided silicon dioxide which has been treated with organosilicon compounds in accordance with the method of this invention, can be readily combined with the other components of a vulcanizable organopolysiloxane composition. Moreover, less energy is consumed in mixing the treated silicon dioxide with the other components of a vulcanizable organopolysiloxane composition. Also, a greater amount of silicon dioxide treated in accordance with this invention can be incorporated in the vulcanizable organopolysiloxane compositions. In addition, due to the lower viscosity or Mooney Plastometer values, the molding and shaping of the vulcanizable diorganopolysiloxane compositions containing the treated silicon dioxide of this invention is greatly facilitated. Likewise, the tendency of the vulcanizable diorganopolysiloxane compositions containing the treated silicon dioxide of this invention to harden or stiffen is substantially less even in the absence of "plastification aids," "mastication aids," plasticizing agents or "antistructure agents" such as diphenylsilanediols or alkoxysilanes. The concept of stiffening or hardening is also known as "crepe aging" or "structure formation." When the antistructuring agents such as diphenylsilanediols or alkoxysilanes are extracted, at least partially by numerous solvents from the elastomers, this presents a problem when these elastomers are used for medical purposes, as electrical insulating material or as sealants in motor vehicles. Furthermore, elastomers prepared from vulcanizable organopolysiloxane compositions containing silicon dioxide treated in accordance with this invention, have improved tensile strength, exhibit improved rebounding resiliency and have low Shore hardness.

Therefore, it is an object of this invention to provide vulcanizable organopolysiloxane compositions having improved properties. Another object of this invention is to provide vulcanizable organopolysiloxane compositions which are substantially free of crepe aging or structure buildup. Still another object of this invention is to provide organopolysiloxane elastomers having improved properties. A further object of this invention is to provide a method for treating a finely divided silicon dioxide which may be readily combined with a vulcanizable organopolysiloxane composition. A still further object of this invention is to provide a method for preparing organopolysiloxane elastomers having improved tensile strength, rebounding resiliency and low Shore hardness.

The foregoing objects and others which will become apparent from the following description are accomplished in accordance with this invention, generally speaking, by subjecting finely divided silicon dioxide particles to mechanical stress during and/or prior to treatment with an organosilicon compound to increase the bulk weight of the silicon dioxide. The treated finely divided silicon dioxide is then mixed with vulcanizable organopolysiloxane compositions containing radical-forming agents and other fillers, if desired, and vulcanized to form elastomers.

Conventional organopolysiloxanes which have been used heretofore in vulcanizable compositions may be employed in the compositions of this invention. These organopolysiloxanes, preferably diorganopolysiloxanes may be represented by the general formula $$Z_nSiR_{3-n}O(SiR_2O)_xSiR_{3-n}Z_n$$

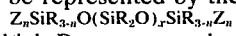

in which R represents the same or different, monovalent hydrocarbon radicals or substituted monovalent hydrocarbon radicals having up to 18 carbon atoms; Z represents a hydroxyl group; $n$ is 0 or 1 and $x$ represents a number of more than 100. The siloxanes illustrated above may contain, generally as impurities other disiloxane units, such as those corresponding to the formulas $RSiO_{3/2}$, $R_3SiO_{1/2}$ and $SiO_{4/2}$, where R is the same as above. The number of such other siloxane units should however, not exceed about 10 mol percent.

Examples of hydrocarbon radicals represented by R are alkyl radicals such as methyl, ethyl, n-propyl, isopropyl and octadecyl radicals; alkenyl radicals such as vinyl, butadienyl and allyl radicals; cycloaliphatic hydrocarbon radicals such as cyclopentyl, cyclohexyl, cyclohexenyl and methylcyclohexyl radicals; aryl radicals such as phenyl and xenyl radicals; aralkyl radicals such as benzyl, beta-phenylethyl and beta-phenylpropyl radicals; as well as alkaryl radicals such as the tolyl radical.

Examples of substituted hydrocarbon radicals represented by R are halogenated hydrocarbon radicals such as the 3,3,3-trifluoropropyl radicals, the chlorophenyl and bromotolyl radicals, and cyanoalkyl radicals such as the beta-cyanoethyl radical. Because of their availability it is preferred that at least 50 percent of the R radicals be methyl radicals. The R radicals which are present in addition to the methyl radicals are especially vinyl and/or phenyl groups. In order to achieve the production of elastomers with particularly good physical properties such as for example a high degree of tensile strength, it is preferred that from 0.01 to about 1 mol percent of the siloxane units in the above described diorganopolysiloxanes be a vinyl group.

In order to avoid the tendency to harden during storage prior to shaping and vulcanization, it is preferred that at least 70 percent of the number of terminal units, i.e., the units corresponding to the formula $$Z_nSiR_{3-n}O \text{ or } SiR_{3-n}Z_n,$$

have a value of zero.

The value of $x$ is such that the diorganopolysiloxanes have a viscosity of at least $10^6$ cSt. at 25°C., or the plasticity of these diorganopolysiloxanes as determined by means of a Brabender plastograph, has a value of from 50 to 1000 and more preferably from 150 to 800.

Any organosilicon compounds which have been reacted heretofore with solid finely divided silicon dioxide particles may be employed in this invention. Generally these organosilicon compounds may be represented by the general formula (R₃Si)ₙZ', where R is the same as above, a is 1 or 2, and Z' represents a halide, hydrogen or a radical of the formula OH, OR', NR'X, ONR'₂, SR', OOCR', O, N(CX) or S, where R' is an alkyl or aryl radical, preferably an alkyl radical having from 1 to 4 hydrocarbon atoms and X is hydrogen or R'. Preferred examples of the radicals represented by R' are methyl, ethyl and propyl radicals.

Examples of suitable organosilicon compounds which may be employed in this invention are hexamethyldisilazane, 1,3-diphenyltetramethyldisilazane, trimethylsilane, trimethylchlorosilane, trimethylethoxysilane; triorganosilylmercaptans such as trimethylsilylmercaptan; triorganosilyloxyacylate such as vinyl dimethylacetoxysilane; triorganosilylamines such as trimethylsilylisopropylamine, trimethylsilylethylamine, dimethylphenylsilylpropylamine and vinyldimethylsilylbutylamine; triorganosilylaminooxy compounds such as diethylaminoxytrimethylsilane and diethyl aminoxy-dimethylphenylsilane; and disiloxanes such as hexamethyldisiloxane, 1,3-diphenyltetramethyldisiloxane, and 1,3-divinyltetramethyldisiloxane.

Examples of other organosilicon compounds which can be reacted with solid, very finely divided silicon dioxide in accordance with this invention are dimethyldichlorosilane, dimethyldiethoxysilane, diphenyldiethoxysilane, vinylmethyldimethoxysilane, octamethylcyclotetrasiloxane and/or dimethylpolysiloxanes having from 2 to 12 silicon atoms per molecule and having an Si-bonded hydroxyl group on each of the terminal units. Also, it is possible to react mixtures of various organosilicon compounds with the silicon dioxide.

An additional advantage of this invention is that excellent results are obtained with compounds that are more readily available than, for example, hexamethyldisilazane. For this reason, trimethylethoxysilane is the preferred organosilicon compound for reacting with the solid finely divided silicon dioxide.

The amount of organosilicon compound which is reacted with the solid finely divided silicon dioxide ranges from about 3 to 25 percent by weight and more preferably from about 4 to 16 percent by weight based on the weight of the silicon dioxide.

The term "solid" as used in connection with the silicon dioxide refers to the silicon dioxide which is present in dry form, i.e., before it is contacted with water and reacted with the organosilicon compounds. In order to accelerate the reaction of the organosilicon compounds with the silicon dioxide and also to increase the bulk weight about 0.3 to 3 percent by weight of water based on the weight of the silicon dioxide is added. This is in addition to the water which may have been previously absorbed by the silicon dioxide.

The solid finely divided silicon dioxide which is employed in this invention preferably has a surface area of at least 50 m²/g and more preferably a surface area of from 150 to 300 m²/g, as measured by means of nitrogen absorption according to the ASTM Special Technical Bulletin No. 51, 1941, pages 95 and ff. (Generally described as the "BET" method.) Because of its purity and because of the small particle size, the silicon dioxide used within the scope of this invention is preferably pyrogenic silicon dioxide, generally identified as "fumed silica." It is preferred that silicon dioxide which is obtained through the hydrolysis of silicon tetrachloride at temperatures above 800°C. be employed in this invention. Additional examples of silicon dioxide having a surface area of at least 50 m²/g are silicic acid hydrogels which have been dehydrated while maintaining the structure, silicic acid-xerogels and precipitated silicon dioxide having a surface of at least 50 m²/g. Mixtures of various types of solid, extremely finely divided silicon dioxide may be used in this invention.

The bulk weight (as per DIN Norm No. 53468) of pyrogenically produced silicon dioxide is from 20 to 85 grams per liter; however, treatment of the silicon dioxide in accordance with this invention substantially increases the bulk weight.

In the mechanical treatment of the silicon dioxide prior to and/or during the reaction with the organosilicon compound, preferably during the reaction with the organosilicon compound, the particle size of the silicon dioxide is decreased, thereby increasing the bulk weight. Any mechanical means may be employed to increase the mechanical stress on the silicon dioxide particles. Examples of suitable means which may be used to impart mechanical stress on the silicon dioxide are mills such as pug mills, tube mills, cone mills, cylinder mills and ball mills.

Generally, air mills or jet mills, i.e., mills in which the particles are ground or reduced in size only by reciprocal friction cannot be used in this invention. These mills do not increase the bulk density of the silicon dioxide and therefore do not increase the bulk weight. (See German Pat. No. 1,048,889.)

It is preferred that sufficient mechanical stress be exerted on the silicon dioxide to decrease the particle size and thus increase the bulk weight to a range of from 120 to about 500 g/l and more preferably in a range of from 150 to 320 g/l. If the bulk weight is increased to a factor of less than 120 g/l, there is the possibility that fillers are present which can impart an undesirably high degree of viscosity to the vulcanizable elastomers. On the other hand, if the bulk weight is increased to more than 500 g/l, then there is the possibility that fillers are present which are not conducive to the production of elastomers having good tensile properties. The increase in the bulk weight is in direct proportion to the duration of the mechanical stress treatment. The proper duration can easily be determined and controlled through the taking of test specimens and by determining the bulk weight of the various samples.

Mills having grinding elements are generally not equipped with heating means or with a means for obtaining a pressure which varies from that of the ambient atmosphere. The reaction of organosilicon compounds with silicon dioxide is therefore preferably carried out at room temperature and at the pressure of the surrounding atmosphere, i.e., at 760 mm Hg (abs) or at approximately 760 mm Hg. When practicable and if desired, it is however, possible to employ other temperatures, preferably in the range of from 15° to 150°C. and/or other pressures as well.

It is possible to employ catalysts other than water which will promote the reaction of silicon dioxide with the organosilicon compounds. Examples of suitable catalysts are hydrogen chloride, amines such as n-butylamine and/or metal compounds such as for example, titanium tetrachloride or dibutyl tin dilaurate. These catalysts may be used alone or in combination with water. However, it is not always necessary to use a catalyst to promote the reaction.

The time for reacting the finely divided silicon dioxide particles with an organosilicon compound may range from as little as 30 minutes up to about 15 hours.

In order to achieve a homogeneous distribution of the silicon dioxide, which has been treated with the organosilicon compounds, with the other components of the vulcanizable composition, it may be desirable to decrease the bulk weight of the silicon dioxide, to a range of from 20 to 85 g/l and more preferably from 50 to 80 g/l before it is mixed with the other components of the composition. The mechanical stress which will lower the bulk weight may for example, be exerted by means of pinned disk mills, air jet mills or jet impingement mills. Occasionally it may be advantageous to decrease the bulk weight by subjecting the treated silicon dioxide to mechanical stress in the presence of an additional amount of the low-molecular weight organosilicon compounds described above, such as trimethylethoxysilane. Also, catalysts such as water may be employed to promote the reaction of the organosilicon compounds with the silicon dioxide.

The reaction of the organosilicon compound with silicon dioxide to either increase or decrease the bulk weight of the silicon dioxide may be performed either as a continuous or as a batch process.

It is preferable that the silicon dioxide which is reacted with the organosilicon compound in accordance with this invention, be employed in the vulcanizable composition in an amount of from 20 to 65 percent by weight based on the total weight of the composition to be vulcanized into an elastomer.

The formation of the radicals required for vulcanization of the compositions based on diorganopolysiloxanes and fillers may be achieved through the same means as used heretofore in the formation of elastomers from compositions based on diorganopolysiloxanes and fillers. Examples of suitable agents which promote the formation of radicals are peroxide compounds, such as acylperoxides, e.g., dibenzoylperoxide, bis-(2,4-dichlorobenzoyl)-peroxide, alkyl peroxides and aryl peroxides such as di-tert.-butylperoxide, 2,5-bis-(tert.-butyl peroxide)-2,5-dimethylhexane and dicumylperoxide and so-called mixed peroxides or peroxide compounds with mixed substitution such as peresters, such as diacetylperoxide-carbonate and tert.-butylperbenzoate. Other known radical-forming agents are azo compounds such as azoisobutyronitrile. The radical formation may however, also be achieved by means of high energy radiation such as alpha, beta or gamma rays.

The compounds employed according to the invention which are to be vulcanized through radical formation may of course contain in addition to the diorganopolysiloxanes and the finely divided silicon dioxide which has been reacted with an organosilicon compound other materials which are generally present in the conventional diorganopolysiloxanes which are destined to be vulcanized into elastomers. Examples of such materials are fillers with a surface area below 50 $m^2/g$, for example quartz powder, chalk and diatomaceous earth, pigments, anti-oxidants, additives for decreasing the pressure deformation residue (compression set), heat stabilizers, flame-retardants, light stabilizers, emulsifiers such as low-molecular weight dimethylpolysiloxanes which are terminal-blocked by trimethylsiloxy groups as well as such materials as may exert a desirable influence upon the electrical properties of the elastomers, for example, conductive carbon. In order to achieve as many desirable properties as possible, it is however, preferred that the diorganopolysiloxane and filler-based compounds employed according to this invention be substantially free of antistructure agents such as low-molecular weight siloxanols or alkoxysilanes.

The treated silicon dioxide filler, which is obtained from the reaction of an organosilicon compound with solid finely divided silicon dioxide particles which have been subjected to mechanical stress prior to and/or during the treatment with the organosilicon compounds, may be used alone or in combination with other fillers in the conventional organopolysiloxane compositions. The diorganopolysiloxanes and the other compounds employed, especially the radical forming agents may be mixed with the treated silicon dioxide in any conventional manner known in the art, such as with a two roll mill. The mixing process is performed quickly and easily, regardless of the order in which the components are added.

The fact that the vulcanizable compositions containing the diorganopolysiloxane and filler-based compounds do not become hard or stiff during storage prior to the final molding and hardening, makes these compounds particularly suited as "non-milling-compounds", i.e., as mixtures which are marketed in the form of bands or granulates and which are not plasticized prior to additional processing.

The fact that the vulcanizable organopolysiloxane compositions of this invention do not have any or at least only a slight tendency to harden or stiffen during storage prior to final molding and hardening, is of particular significance when these compositions are to be stored for more than 48 hours between the time they are first prepared and the final molding process.

The vulcanization of the organopolysiloxane compositions of this invention which contain at least in part the treated finely divided silicon dioxide particles can be conducted at such temperatures and pressures as are generally used for vulcanizing compositions of this type. Generally, the temperatures employed in vulcanizing compositions which contain peroxide compounds or azo compounds, are in the range of from about 100° to about 200°C.

The organopolysiloxane elastomers produced in accordance with this invention may be employed wherever the use of organopolysiloxane elastomers are indicated. For example, these elastomers may be used for hoses, gaskets, electric insulating materials and essential components of areal heating elements. area Various embodiments of this invention are further illustrated in the following examples in which all parts are by weight unless otherwise specified.

EXAMPLE 1 a. About 200 parts of a pyrogenically produced silicon dioxide having a BET surface area of 200 $m^2/g$ and a bulk weight of 65 g/liter are mixed with about 15 parts of trimethylethoxysilane and 2 parts of water and placed in a 5 liter porcelain ball mill. About 1.5 liters of the space is taken up by porcelain balls having a diameter from 15 to 40 mm. After the air in the mill has been displaced by gaseous hydrogen chloride, the mill is operated for 2 hours at room temperature at 70 rpm. The contents of the mill are then heated for 2 hours at 200°C. in order to free the product of volatile components. The filler (A) thus obtained has a bulk weight (DIN 53468) of 280 g/liter.

b. About 40 parts of filler (A) are mixed in a laboratory drum at a drum temperature of 20°C. and a friction of 1:1.15 with 100 parts of trimethylsiloxy endblocked diorganopolysiloxane having a viscosity of $10^6$ cSt at 25°C. and consists of 99.9 mol percent of dimethylsiloxane and 0.1 mol percent of vinylmethylsiloxane units. The mixture thus obtained is mixed with 1 percent by weight of dibenzoyl peroxide based on the weight of the mixture.

EXAMPLE 2

The procedure described in Example 1 is repeated except that 40 parts by weight of a filler (B) is substituted for filler (A). Filler (B) is prepared in the following manner:

About 200 parts of a pyrogenically produced silicon dioxide which has a BET-surface of 200 m²/g and a bulk weight of 65 g/liter, are mixed with about 15 parts of trimethylethoxysilane and 2 parts of water and heated in the presence of gaseous hydrogen chloride for 8 hours at a temperature of 100°C. Volatile components are removed by heating the resulting product for 2 hours at a temperature of 200°C. The thus obtained filler has a bulk weight of 65 g/liter.

EXAMPLE 3

The procedure described in Example 1 is repeated except that 40 parts of filler (C) is substituted for filler (A). Filler (C) is available under the name "Aerosil D 153" (a registered trademark of Deutsche Gold- und Silberscheideanstalt, Frankfurt a.M.) This filler is pyrogenically obtained in the gaseous phase and combined with a silicon dioxide which has been reacted with an organosilicon compound, presumably a methylchlorosilane to provide a filler with a BET-surface of 200 m²/g. The bulk weight of the silicon dioxide is not increased through mechanical stress before or after the reaction with the organosilicon compound.

EXAMPLE 4

The procedure described in Example 1 is repeated except that 40 parts of filler (D) is substituted for filler (A). Filler (D) is available under the trademark "Silanox 101", produced by Cabot Corporation, Boston, Massachusetts, U.S.A.; which is pyrogenically obtained in the gaseous phase and combined with silicon dioxide which has been reacted with an organosilicon compound, presumably hexamethyldisilazane, to provide a filler having a BET-surface of 200 m²/g. The bulk weight of the silicon dioxide is not increased through mechanical stress before or after the reaction with the organosilicon compound.

The Mooney plastometer values of the compounds, as well as the time that is required to soft-roll or plasticize the compounds, are determined after storage at room temperature. The results are illustrated in Table I.

TABLE I

| Filler Compound | Mooney Plastometer values | | | Soft-roll time in min. after | | |
|---|---|---|---|---|---|---|
| | 7 days | 14 days | 28 days | 7 days | 14 days | 28 days |
| A | 20 | 21 | 21 | 0 | 0 | 0 |
| B | 48 | 53 | 55 | 2.5 | 3 | 6 |
| C | 39 | 40 | 49 | 6 | 7 | 10 |
| D | 54 | 55 | * | 8 | 9 | 10 |

*cannot be measured

After storage for 7 days at room temperature, the compounds prepared in accordance with Examples 1(b), 2, 3 and 4 are press cured for 10 minutes at 135°C. in a power press and then post cured in a recirculating air furnace for 4 hours at 200°C. The Shore hardnesses, rebounding elasticities and the tear strength of the elastomers are illustrated in Table II.

TABLE II

| Filler Compound | Shore-Hardness A | Rebounding Resiliency-Percent | Tear Strength kg/cm or kp/cm |
|---|---|---|---|
| A | 38 | 56 | 12 |
| B | 53 | 45 | 11 |
| C | 62 | 48 | 14 |
| D | 58 | 46 | 10 |

EXAMPLE 5

About 150 parts of a diorganopolysiloxane having a viscosity of $10^6$ cSt at 25°C. which is endblocked by trimethylsiloxy groups and which consists of 99.9 mol percent dimethylsiloxane and 0.1 mol percent vinylmethylsiloxane units are mixed in a laboratory drum at a temperature of from 20° to 30°C. at a friction of 1:1.15 and 20 rpm with filler (A). A similar composition is prepared using fillers (B), (C), (D) and (E) respectively. Filler (E) is a pyrogenicall produced untreated silicon dioxide having a BET-surface area of 200 m²/g and a bulk weight of 65 g/liter.

The addition of the filler is interrupted whenever the compound absorbs less than 5 parts of filler within 5 minutes. After the thus obtained compounds have been mixed with dibenzoylperoxide to the extent of 1 percent by weight, they are combined with a diorganopolysiloxane in accordance with Example 1.

The results are illustrated in Table III.

TABLE III

| | COMPOUNDS | | |
|---|---|---|---|
| Compounds w/fillers | Filler in parts per 100 parts diorganoloxane | Time, in min. needed for adding filler | Soft-roll time in min. after 7 days |
| A | 120 | 20 | 2 |
| B | 85 | 25 | 5 |
| C | 65 | 30 | 6 |
| D | 70 | 35 | 4.5 |
| E | 50 | 30 | 8 |

The compounds are then vulcanized in accordance with Example 4. The physical properties are illustrated in Table IV.

TABLE IV

| | ELASTOMERS | |
|---|---|---|
| Elastomer w/filler | Tear resistance kg/cm or kp/cm | Shore-hardness A |
| A | 19 | 84 |
| B | 11 | 84 |
| C | 18 | 81 |
| D | — | 85 |
| E | 9 | 75 |

Although specific examples of the invention have been described herein, it is not intended to limit the

What is claimed is:

1. An organopolysiloxane composition capable of being vulcanized to an elastomer containing a diorganopolysiloxane having a viscosity of at least $10^6$ cSt at 25°C. in which the organic groups are selected from the class consisting of monovalent hydrocarbon radicals, halogenated monovalent hydrocarbon radicals and cyanoalkyl radicals, an agent capable of forming free radicals selected from the class consisting of peroxides, azo compounds and high energy radiation and a filler in which at least a portion of said filler is finely divided silicon dioxide particles having a surface area of at least 50 m²/g. which have been subjected to mechanical stress and reacted with an organosilicon compound to increase the bulk weight of the silicon dioxide to a range of from about 120 to about 500 grams per liter, said organosilicon compound having the formula $(R_3Si)_aZ'$, wherein R is selected from the class consisting of monovalent hydrocarbon radicals, halogenated monovalent hydrocarbon radicals and cyanoalkyl radicals, Z' is selected from the class consisting of hydrogen, halogen, OH, OR', NR'X, ONR'$_2$, SR', OOCR', O, N(CX) and S, wherein R' is selected from the class consisting of alkyl radicals and aryl radicals, X is selected from the class consisting of hydrogen and R' and $a$ is 1 or 2.

2. The composition of claim 1 wherein the bulk weight of the treated silicon dioxide is from 150 to 320 grams per liter.

3. The composition of claim 1 wherein the organosilicon compound is trimethylethoxysilane.

4. The composition of claim 1 wherein the treated silicon dioxide is subsequently subjected to mechanical stress to reduce the bulk weight of the silicon dioxide.

5. A process for preparing a vulcanizable organopolysiloxane having reduced structure formation which comprises mixing a filler with a diorganopolysiloxane having a viscosity of at least $10^6$ cSt at 25°C. in which the organic groups are selected from the class consisting of monovalent hydrocarbon radicals, halogenated monovalent hydrocarbon radicals, and cyanoalkyl radicals, and an agent capable of forming free radicals selected from the class consisting of peroxides, azo compounds and high energy radiation, said filler contains finely divided silicon dioxide particles having a surface area of at least 50 m²/g which have been subjected to mechanical stress and reacted with an organosilicon compound to increase the bulk weight of the silicon dioxide to a range of from about 120 to 150 grams per liter, said organosilicon compound having the formula $(R_3Si)_aZ'$ wherein R is selected from the class consisting of monovalent hydrocarbon radicals, halogenated monovalent hydrocarbon radicals and cyanoalkyl radicals, Z' is selected from the class consisting of hydrogen, halogen, OH, OR', NR'X, ONR'$_2$, SR', OOCR', O, N(CX) and S where R' is selected from the class consisting of alkyl radicals and aryl radicals, X is selected from the class consisting of hydrogen and R' and $a$ is 1 or 2.

6. The process of claim 5 wherein the treated silicon dioxide is subsequently subjected to mechanical stress to reduce its bulk weight prior to mixing with the diorganopolysiloxane and the radical forming agent.

7. The process of claim 5 wherein the silicon dioxide is treated with the organosilicon compound while being subjected to mechanical stress in a ball mill.

* * * * *